Nov. 25, 1969   F. A. UPSON   3,480,404
APPARATUS FOR REACTING POLYMERIC MATERIAL
Filed April 29, 1966   2 Sheets-Sheet 1

INVENTOR.
Frank A. Upson

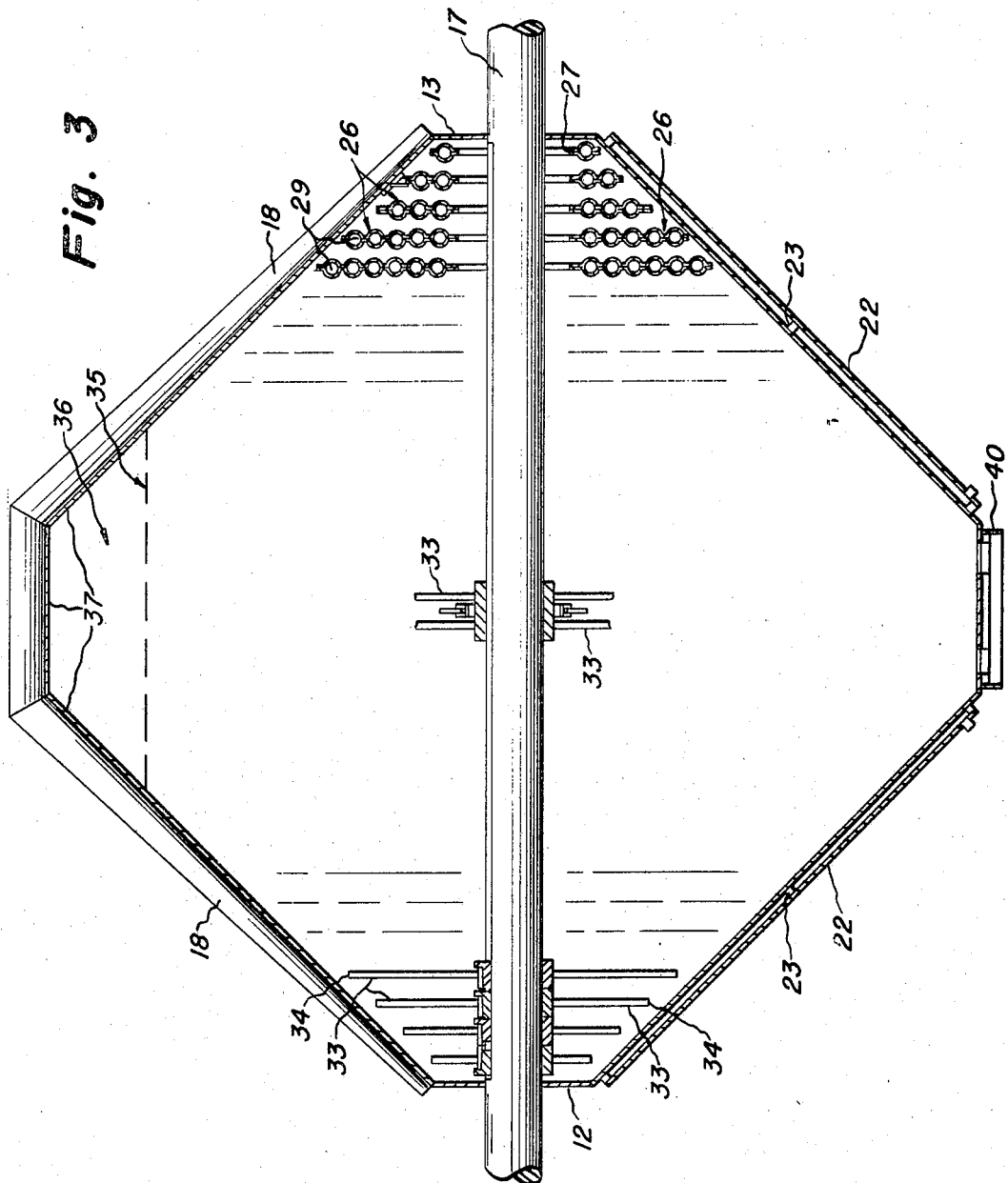

United States Patent Office 3,480,404
Patented Nov. 25, 1969

3,480,404
APPARATUS FOR REACTING POLYMERIC
MATERIAL
Frank A. Upson, Hammond, Ind., assignor to Standard Oil
Company, Chicago, Ill., a corporation of Indiana
Filed Apr. 29, 1966, Ser. No. 546,298
Int. Cl. B01t 1/00
U.S. Cl. 23—285                                 7 Claims

ABSTRACT OF THE DISCLOSURE

Two hollow, truncated, conical members are joined together to form a reaction vessel, and a rotating shaft carrying a plurality of radially extending blades is stretched between the truncated ends of the reaction vessel. Interposed between the blades are circular plate coils through which flows circulating heat exchange medium that heats reacting constituents within the vessel. At the bottom of the vessel is a port, which when open, allows material to quickly flow from the vessel.

---

This invention relates to improved method and apparatus for reacting polymeric materials in a closed vessel. The invention particularly relates to improved method and apparatus for producing high impact polystyrenes in a novel reactor.

In the production of polymeric materials, such as high impact polystyrenes, monomers including polymerizable vinyl compounds are subjected to heat in a closed vessel to develop the desired polymerization reaction in the production of the final polymer material. The art exemplifies various types of thermo plastic polymer reactors, such as U.S. Patent No. 2,931,793, to Melchore, wherein a cylindrical vertically oriented reactor is equipped with a revolving longitudinal shaft having mounted thereon a rotating cage to provide agitation to the monomeric material contained therein. A U.S. Patent No. 2,530,409 to Stober et al. concerns a method for polymerizing styrene and discloses a cylindrical reactor into which partial polymer from a pre-polymerizer passes through the cylindrical barrel of the reactor in a horizontal direction by the operation of an auger or screw-type conveyor centrally mounted within the cylindrical reactor. Another patent, No. 3, 140,917, to Klein, concerns a so-called "plate and frame" type of polymerization reactor wherein a vessel is equipped with a series of substantially rectangular alternate polymerization zones and heat-controlling cells within the rigid supporting vessel. The Wulff et al. Patent No. 2,077,542 concerns apparatus for producing molded artificial masses, wherein a cylindrical tank vertically oriented is equipped with two sets of spiral shaped pipe coils, each set having an inlet and outlet, one set located at the top of the reactor, the other at the bottom. The material is introduced at the top of the reactor and heat transfer occurs through the pipe coils centrally located from the longitudinal axis within the vessel. The reacting material is withdrawn from the lower end of the tank by an auger or screw-type conveyor. A patent to McDonald et al., No. 2,727,884, concerns a process for mass polymerization wherein a reactor having a substantially square cross sectional shape has a longitudinal axis oriented vertically and alternate banks of horizontal cooling pipes oriented in the opposite transverse directions located between rigid horizontally elongated paddles attached to a revolving shaft passing through the longitudinal axis of the vessel. According to the teaching of this patent, specific structural elements provide for agitation of the batch polymer without vertical mixing.

The foregoing are examples of the state of the art, which is fraught with many problems, including the need for more positive temperature control and optimum maintenance of uniform heat throughout the contained mass, faster drainage of the reacted product from the vessel, less deposition of material in pockets and on internal surfaces of the vessel, and self-cleaning of the surfaces located within the expansion zone not occupied by product within the reactor.

Since the quality of the product withdrawn from the reactor is a function of uniform temperature maintenance throughout all inner locations of the reactor during a desired time period, and the ability to quickly and substantially completely remove the reacted product from the vessel, inner design and vessel configuration are of great importance. If deposits of reacted material or remnants of slow-draining material remain in pockets or around pipes and other structures within the reactor, the subsequent charge of monomeric material to be polymerized is adversely affected by the presence of these slow-draining previously-reacted polymers. Furthermore, where the reactor design is such that an expansion zone remains as an unfilled space within the reactor, carbonaceous material is emitted from the reactants during the reaction, deposited on the exposed inner surfaces of the unfilled expansion zone, and subsequently flaked off into the polymer causing undesirable black specks in the final product.

It is, therefore, a primary object of this invention to provide apparatus and method for polymerizing a thermo plastic material under conditions of improved heat transfer and superior uniformity of temperature throughout the entire mass of the polymerizing material.

Another object of this invention is to provide apparatus and method wherein there is obtained a faster and more complete removal of the mass of material from within the reactor apparatus.

An additional object of this invention is to provide method and apparatus wherein the polymerizing material cleans all surfaces in the expansion zone within the reactor, thereby preventing the deposition and subsequent flaking of carbonaceous material from exopsed surfaces in the unfilled portion of the expansion zone.

A further object of this invention is to provide apparatus having a novel structural configuration which maintains a shape that promotes fast removal of product and contributes to the maintenance of temperature uniformity through a fully jacketed design.

Another object of this invention is to provide novel method and apparatus for polymerizing material in a uniform heat zone followed by quick removal of the polymerized prdouct in order to obtain a shortened cycle duration and a commensurately greater production volume of superior product.

It has been discovered that when a reactor vessel having a first side portion in the shape of a truncated cone and a second side portion of similar shape are attached to a cylindrical belt extending circumferentially to form a closed vessel, said vessel having disposed through the center of a plane passing through the diameter of said belt a revolving shaft carrying a plurality of rigidly attached diametrically opposed blades which revolve between plate coils, an improved reactor vessel results which consistently produces superior thermo plastic products in less time than heretofore known. The interior of the vessel is equipped with a series of vertically oriented plate coils extending along the axis of each conically shaped side portion and through the transverse axis of said cylindrical belt. The plate coils are provided with a central opening to accommodate the passage of the horizontally oriented revolving shaft and the adjacent plates provide communicating chambers which are spaced to allow the passage of elongated blades which rotate in a vertical plane between said plates in said chambers as the central shaft rotates. Communication between chambers throughout the center of the vessel is maintained between the upper and lower walls of the vessel and each plate coil, and about and between the shaft and the plate coils. The cylindrical belt is an optional structural feature which merely provides for the addition of lower openings such as pump suction ports. It is foreseeable and within the purview of this invention that the cylindrical circumferential belt can be eliminated and other means adapted for providing lower openings in the vessel structure defined by two truncated coens being joined at their bases.

The accompanying drawings illustrate the preferred embodiment of this invention; however, it is understood that the specific details of the system may vary widely without departing from the basic principles of the invention wherein:

FIG. 3 is a sectional elevation view of the reactor taken along line 3—3 in FIG. 1.

Figure 1:
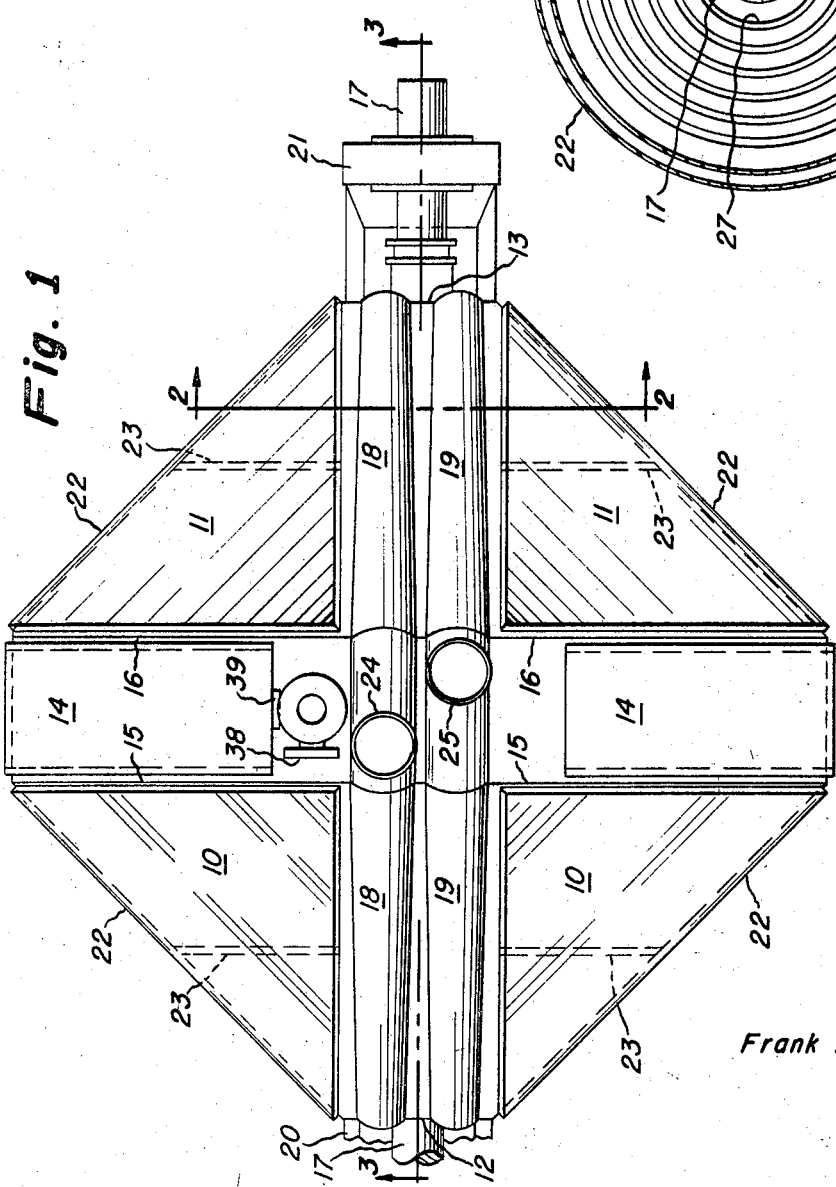
FIG. 1 is a plan view showing the exterior configuration of the vessel.

In the plan view of FIG. 1, it is seen that first side portion designated 10 and second side portion 11 each have a configuration similar to that of a truncated cone wherein the truncations on the terminal sides of said vessel occur at the ends 12 and 13. The conical first side 10 and second side 11 are attached to circumferential belt 14 at the terminating edges 15 and 16, respectively, where the attachment is made by welding or other suitable means. Central shaft 17 extends through the vessel on the longitudinal axis of cylindrical belt 14. Exteriorly imposed across the top of said vessel and extending to truncations 12 and 13 are outlet and inlet headers 18 and 19, respectively, for supplying and removing a circulatory heat transfer medium. Bearings 20 and support brackets 21 located at the truncated surfaces 12 and 13 through which pass the extremities of shaft 17 provide for rotation of the shaft within the stationary vessel by power sources and speed reducers not shown. The vessel is supported by conventional floor mountings not shown, rigidly attached to the lower walls of the conical portions 10 and 11 of the vessel. A continuous jacket 22 covers the surface of the reactor vessel and passages 23 communicating with headers 18 and 19 provide for continuity of circulation of the heat exchange medium. Ports 24 and 25 in headers 18 and 19 on circumferential belt 14 provide for the emission and introduction of the heat exchange medium to the headers.

Figure 2:
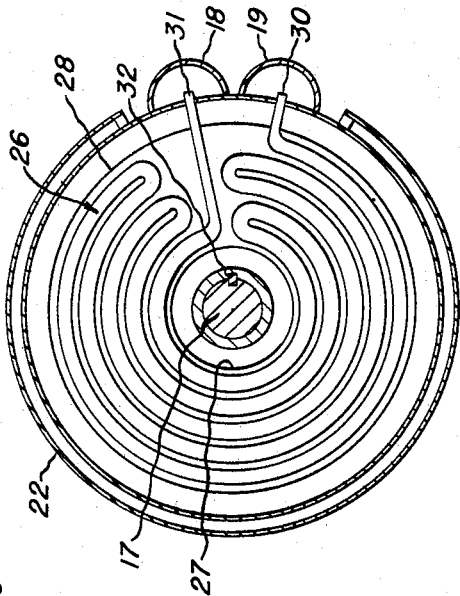
FIG. 2 is an elevation view of a plate coil taken along line 2—2 in FIG. 1.

FIG. 2 shows an elevational view of a plate coil 26 with shaft 17, headers 18 and 19, and vessel shell jacket 22 in cross section. Plate coil 26 is circular in shape and has a central opening defined by circumference 27, the continuous portion of said plate extending from circumference 27 to outer circumference 28. The plate coil can be of any conventional construction, such as the superimposing of one plate having ridges and valleys upon another plate of similar design to form inner passages 29 which permit the circulation of a heat transfer medium through the passages of the plate when the transfer medium is introduced into port 30 from header 19 shown in cross section. Outlet port 31 in header 18 emits the heat transfer medium introduced at port 30, thus allowing continuous circulation of said medium throughout said plate 26. Shaft 17 is keyed to moveable bearing 20 by key and keyway 32.

FIG. 3 displays a sectional elevation view taken along line 3—3 in FIG. 1, wherein it is seen that shaft 17 centrally disposed through the truncated surfaces 12 and 13 and along the longitudinal axis of cylindrical circumferential belt 14, passes through the center of the vessel. Rigidly mounted at spaced intervals along shaft 17 are elongated blade 33 oriented in a common plane and extending from shaft 17 to a point equidistant from the terminus 34 of each blade to the inner surface or wall of the vessel. Consequently, the volume described by the termini 34 of blades 33 as they move with a revolution of shaft 17 is substantially similar to but smaller than the inner configuration of the reactor vessel.

Plate coils 26 are shown in cross section in FIG. 3 and are so mounted at remote points along the inner walls of the vessel in a fashion which generally describes the shape of the reactor, yet sufficient distances exist between the surface of shaft 17 and the inner edge of the plate coil defined by circumference 27, and between the outer edge defined by circumference 28 and the interior vessel walls that ample communication between the open chambers formed by the partitioning plate coils permit the flow of the materials throughout all parts of the vessel. The communicating chambers formed by the spaced adjacent plate coils provide paths through which the blades 33 travel as they move with the rotation of shaft 17 between the stationary plate coils 26. The previously mentioned construction of plate coils 26 provides for mildly undulating plate coil surfaces which are vertically oriented to impart fast and substantially complete drainage of the highly viscous reacted polymeric material from the hot plate coil surfaces to the steeply sloping lower interior walls of the conical side portions 10 and 11 through openings in the lower part of cylindrical belt 14.

The top of the vessel adjacent to header outlet 24 has provided therein a plurality of openings shown in FIG. 1 for the introduction of monomer and other reactants to a level located at about line 35 in order to provide an expansion zone 36 throughout part of which the initial charge of monomeric and other materials expand during polymerization reactions. Since the plate coils 26 extend upward into the expansion zone 36 and provide the communicating chambers between the spaced adjacent plate coils to define paths and accommodate the passage of blades 33 therebetween as they move with the rotation of shaft 17, a significant surface area of expansion zone wall 37 and plate coil surface may be exposed in the zone unoccupied by reactants where carbonaceous deposits emitted during the reaction ordinarily form and subsequently flake off into the final polymerized product. In this novel design the flaking off of carbonaceous matter which causes undesirable black specks in the polymer product has been eliminated because of the self-cleaning effect of the moving blades carrying reaction product which sweeps any surfaces normally exposed and removes from them any carbonaceous matter before it builds up and becomes undesirable black specks in the polymer.

In operation, the cycle begins when reactants are introduced through filler opening 38 displacing the inert gas within the interior of the vessel through opening 39 in FIG. 1 as the vessel is charged with material to about a level shown by line 35 in FIG. 3. A heat exchange medium is continuously introduced into inlet 25 of header 19 which extends across the top of the vessel between truncated surfaces 12 and 13. Header 25 communicates with plate coils 26 and the vessel jacket 22 so that the heat exchange medium is circulated through said coils and said jacket to provide for uniform heat throughout the interior of the vessel. Header 18 collects the heat exchange medium as it is emitted from plate coils 26 and vessel jacket 22 and the medium is passed from header 18 through outlet 24 for reheating.

High impact polystyrenes include natural or synthetic rubber compounds which are dissolved in the styrene monomer prior to the charging of the reactor and the application of a uniform heat to effect a uniform polymerization. To produce a high quality high impact rubber modified polystyrene, it is necessary to develop uniform graft co-polymerization of the styrene on the rubber contained in the starting styrene monomeric material. Since the starting materials are broadly defined as vinyl or vinylidene monomers, homo-, co-, and graft co-polymerization may occur wherein the polymerizing of one polymer, the co-polymerizing of two different monomers, or the graft co-polymerizing of a polymer and a monomer may take place. The apparatus and method defined herein is particularly advantageous for producing an improved high impact rubber modified polystyrene material because by the generation of a uniform heat throughout the mass of polymerizing material, there is produced a finished product having a more uniform molecular weight, better elongation properties, and a higher Izod impact strength.

As the material is held within the reactor in a state of uniform heat, shaft 17 can be rotated by any conventional means, not shown, causing elongated blades 33 to rotate in vertically oriented paths transverse to said shaft within communicating chambers formed by adjacent plate coils. It is preferred that the rotation of shaft 17 be within the range of 0.5–9 r.p.m. to slowly move the polymerizing material to uniformly react said material and to establish a temperature equilibrium throughout the reacting mass in the zone of uniform heat. The temperature within the reactor may be maintained within the range of 100–225° C., preferably 200–225° C. as the polymerizing mass is being slowly moved in a substantially vertically oriented circular direction across heat exchange surfaces, the blades 33 which pass through any unfilled portion of the reaction zone carry enough of the reacting material so as to sweep the exposed surfaces therein to continuously clean said surfaces, thereby preventing the deposit and subsequent flaking of carbonaceous material from the exposed surfaces into the polymerizing charge of thermo plastic forming material. Consequently, the purpose of this design is to provide for the solution of serious problems heretofore existing in that none of the products produced by the disclosed apparatus and method have the undesirable black specks frequently found in thermo plastic products, such as styrenes.

When the polymerizing mass within the reactor is removed from the vessel, a plurality of openings are made by any conventional manner at the lowest portion of the vessel through the cylindrical circumferential belt 14. However, should the circumferential belt be eliminated from the structure by attaching the open bases of the respective cones by a suitable joining means to form said vessel, other conventional means can be adapted for supplying lower openings or pump suction ports to the reactor. The polymeric material drains quickly from the communicating chambers defined by the vertically oriented plate coils which have mildly undulating, substantially vertical hot surfaces. The reacted material drains down along the steeply inclined lower conical walls of the cone-shaped portions 10 and 11 and out through the plurality of openings at the lowest part of the vessel designated 40. Since a uniform zone of heat exists through the interior of the reactor and because most surfaces therein are substantially smooth, clean and vertically oriented or steeply sloping, few traps exist to hold the draining product, and obstructions to the quickly draining polymer are minimized. This structure permits relatively fast and substantially complete removal of the product from the reactor. Because high and uniform quality of the final product is a function of temperature maintenance within the reactor and the time during which the reactants are held within the vessel, it is of great importance that at the designated time of their removal, drainage should be as fast as possible. Since reacted product trapped within the vessel adversely effects the quality of the following batch, it is also important that substantially complete drainage be effected.

While in the foregoing specification this invention has been described in relation to preferred embodiments thereof, and many details have been set forth for the purpose of illustration, it will be apparent to those skilled in the art that the invention is susceptible to other embodiments and that many of the details set forth herein can be varied considerably without departing from the basic principles of the invention.

I claim:

1. A reactor apparatus for introducing reacting constituents, reacting said constituents, and quickly removing thermoplastic materials comprising in combination: a first side portion having a conical shape and a transversely truncated surface parallel to its open base; a second side portion similarly shaped as said first side portion; a joining means, said means joining the side portions together at the open bases of the cones to form a closed vessel; inlet means in the upper portion of the joining means for introducing reacting constituents into the vessel, and outlet means in the lower portion of the joining means which when opened permit quick flow removal of thermoplastic materials from the vessel; a centrally horizontally oriented rotatable shaft extending through said vessel and through each of said truncated surfaces, said shaft having rigidly mounted thereon a series of a plurality of elongated blades which move in a plane transverse to said shaft; said vessel having packed therein a series of adjacent plate coils each in a plane transverse to said shaft, said adjacent plate coils forming communicating chambers through which said blades pass; said conical side portions having jackets for circulating a heat exchange medium, and header means for introducing and gathering the circulating heat exchange medium into and from said plates and jackets.

2. The structure of claim 1 wherein said joining means is a cylindrical circumferential belt, each terminus of its height attached to the base of each of said side portions to form a closed vessel.

3. The structure of claim 1 wherein said plurality of blades rigidly attached to said shaft are diametrically opposed and lie on a line passing through the longitudinal axis of said shaft, said line located in a plane transverse to said shaft.

4. The structure of claim 1 wherein said blades are elongated and each blade extends outward from said shaft to a point equidistant from the terminus of said blade to the inner wall of said vessel.

5. The structure of claim 1 wherein said header means are lines which extend across the upper exterior of said vessel from the truncated surface of the first conical portion to the truncated surface of the second conical portion.

6. The structure of claim 4 wherein said header means communicates with the inlet and outlet ports of each of said series of plate coils and with each of the jackets of said conical portions.

7. The combination comprising:
a pair of hollow, generally conical members each having an opened base end and a truncated end;
joining means which join said members together at their base ends to form a reaction vessel;
a rotatable shaft extending between said truncated ends;
a plurality of blades mounted to said shaft and extending radially therefrom;
circular coil means mounted in said vessel between the blades;
means which pass a heat exchange medium through the coil means;
inlet means in the vessel for introducing materials into said vessel; and
outlet means in the vessel below the shaft and in the lower portion of the joining means which permit quick removal of materials from said vessel.

References Cited

UNITED STATES PATENTS
| | | | |
|---|---|---|---|
| 960,105 | 5/1910 | Molander | 165—94 |
| 2,050,654 | 8/1936 | Gerstenberg | 165—109 XR |

FOREIGN PATENTS
| | | |
|---|---|---|
| 646,098 | 6/1937 | Germany. |

JAMES H. TAYMAN, JR., Primary Examiner

U.S. Cl. X.R.

23—252; 165—94; 259—9, 109; 260—93.5